(12) United States Patent
Im

(10) Patent No.: US 11,951,473 B2
(45) Date of Patent: Apr. 9, 2024

(54) VIAL DEVICE FOR STORING AND SMEARING EXFOLIATIVE CELLS

(71) Applicant: BIODYNE CO., LTD., Gyeonggi-do (KR)

(72) Inventor: Wook Bin Im, Seongnam-Si (KR)

(73) Assignee: BIODYNE CO., LTD., Seoul (KR)

( * ) Notice: Subject to any disclaimer, the term of this patent is extended or adjusted under 35 U.S.C. 154(b) by 587 days.

(21) Appl. No.: 17/274,117

(22) PCT Filed: Jul. 31, 2019

(86) PCT No.: PCT/KR2019/009582
§ 371 (c)(1),
(2) Date: Mar. 5, 2021

(87) PCT Pub. No.: WO2020/050504
PCT Pub. Date: Mar. 12, 2020

(65) Prior Publication Data
US 2021/0187498 A1    Jun. 24, 2021

(30) Foreign Application Priority Data
Sep. 8, 2018    (KR) .................. 10-2018-0107443

(51) Int. Cl.
*B01L 3/00* (2006.01)
*A61J 1/05* (2006.01)
*G01N 1/28* (2006.01)

(52) U.S. Cl.
CPC .............. *B01L 3/5023* (2013.01); *A61J 1/05* (2013.01); *G01N 1/2813* (2013.01); *B01L 2300/042* (2013.01); *B01L 2300/044* (2013.01); *B01L 2300/0832* (2013.01)

(58) Field of Classification Search
None
See application file for complete search history.

(56) References Cited

U.S. PATENT DOCUMENTS

| | | | |
|---|---|---|---|
| 4,803,998 A | 2/1989 | Kezes et al. | |
| 2006/0088930 A1* | 4/2006 | Smith | B01D 61/18 435/287.9 |
| 2014/0193848 A1* | 7/2014 | Kaufman | B01L 3/508 422/558 |

FOREIGN PATENT DOCUMENTS

| | | |
|---|---|---|
| JP | 2009-038989 A | 2/2009 |
| KR | 10-1019085 B1 | 3/2011 |
| KR | 20-2011-0006453 U | 6/2011 |
| KR | 10-2013-0088544    * | 8/2013 |

(Continued)

*Primary Examiner* — P. Kathryn Wright
(74) *Attorney, Agent, or Firm* — PARK LAW FIRM

(57) ABSTRACT

The present invention relates to a vial device for storing a specimen which containing exfoliative cells of a human body and for being used in smearing the exfoliative cells. More specifically, the present invention relates to a technology, which may be used with an exfoliative cell processing device for smearing exfoliative cells, for moving manually or automatically in the exfoliative cell processing device with containing the exfoliative cells so as to provide a part of the exfoliative cells to a slide of the exfoliative cell processing device. The present invention has an advantage in that, due to a recess and a latching rib in the opening cap, the opening cap may be automatically separated from the container member without user operation through a rotating member of the exfoliative cell processing device.

6 Claims, 10 Drawing Sheets

(56) References Cited

FOREIGN PATENT DOCUMENTS

| KR | 10-2013-0088544 A | 8/2013 |
| KR | 10-2013-0131714 A | 12/2013 |
| KR | 10-2016-0061645 A | 6/2016 |

* cited by examiner

VIAL DEVICE FOR STORING AND SMEARING EXFOLIATIVE CELLS

FIELD OF THE INVENTION

The present invention relates to a vial device for storing a specimen which containing exfoliative cells of a human body and for being used in smearing the exfoliative cells.

More specifically, the present invention relates to a technology, which may be used with an exfoliative cell processing device for smearing exfoliative cells, for moving manually or automatically in the exfoliative cell processing device with containing the exfoliative cells so as to provide a part of the exfoliative cells to a slide of the exfoliative cell processing device.

BACKGROUND ART

In general, exfoliative cells are obtained from a specimen (e.g., exfoliative cells and liquid medium) of a human body, and then are smeared (spread thinly) on a slide in order to accurately observe and diagnose the state of the exfoliative cells.

Here, the smearing on the slide for papsmear test are conventionally performed manually using tools (e.g., dropper, cotton swab).

However, due to the nature of exfoliative cells, if the exfoliative cells are exposed to user's skin, there is a risk of infection. Further, due to the manual smearing, the exfoliative cells overlap each other so as to form non-uniform layers, thereby interfering with observation and diagnosis.

Accordingly, a smearing technology is required so that specimen may be effectively stored as containing exfoliative cells and the exfoliative cells may be accurately smeared in a single layer.

DISCLOSURE OF INVENTION

Technical Problem

The present invention is proposed in view of the above-mentioned feature. It is an object of the present invention to provide a vial device for storing a specimen which containing exfoliative cells and for spreading the exfoliative cells during smearing on slides.

In particular, it is an object of the present invention to provide a vial device for storing and smearing exfoliative cells which may be effectively used with an exfoliative cell processing device in smearing the exfoliative cells.

Technical Solution

In order to achieve the above object, the vial device for storing and smearing exfoliative cells may comprise: a container member (110) having an entrance on its upper end for containing exfoliative cells and liquid medium inside thereof; a permeable membrane member (120) being disposed inside of the container member corresponding to the entrance and having a porous membrane, whereby the permeable membrane member blocks the exfoliative cells and liquid medium in the container member from falling down when the container member is disposed upside down with letting the entrance being positioned at the bottom, and whereby the permeable membrane member discharges downward a part of the liquid medium and the exfoliative cells of the container member when the container member is applied on an external force in the upside-down position; a membrane fixing member (130) being mounted on the edge of the entrance of the container member, wherein the membrane fixing member is integrally fastened with the permeable membrane member along the rim of the permeable membrane member; and an opening cap (140) being detachably fastened with the membrane fixing member so as to block the permeable membrane member from moving through the membrane fixing member.

Further, the membrane fixing member (130) may be detachably fastened with the rim of the container member so as to form a double-cap structure together with the opening cap.

Further, the opening cap (140) may comprise: a recess (141) being recessed downward in the central part of the upper surface thereof; and one or more latching ribs (142) being connected to the inner wall of the recess as being erected on the inside of the recess, wherein when an external rotating member is inserted into the recess and rotates, the rotating member becomes caught by the latching ribs so that the opening cap separates from the membrane fixing member.

Further, the container member (110) may have a hollow cylindrical shape with its inner wall being flat and smooth.

Further, the container member (110) may comprise: a lower outward-step portion (111) protruding along the rim on the lower outer surface of the container member; wherein when an external grip member grips the outer surface of the container member with disposing the container member upside down so as to let the opening cap face downward, the lower outward-step portion is caught by the grip member so as to prevent the container member from slipping downward.

Further, the container member (110) may comprise: an inward-step portion (113) being cut inwardly along the rim of the lower outer surface of the container member; wherein the inward-step portion (113) is caught by an external grip member

Advantageous Effects

The present invention has an advantage in that an opening cap in an entrance of a container member containing a specimen including exfoliative cells may store the specimen and a permeable membrane member fastened with the entrance of a container member by a membrane fixing member may enable a user to well perform smearing of the exfoliative cells on a slide.

Further, the present invention has an advantage in that, due to a permeable membrane member in the entrance of a container member, when the container member is upside down with letting the permeable membrane member coming into contact with the slide, the exfoliative cells sink down in the container member due to higher specific gravity than liquid medium or other by-products, which may enable the effective smearing.

Further, the present invention has an advantage in that, due to a recess and a latching rib in the opening cap, the opening cap may be automatically separated from the container member without user operation through a rotating member of the exfoliative cell processing device.

Further, the present invention has an advantage in that, due to a lower outward-step portion or an inward-step portion on the outer surface of the container member, the exfoliative cell processing device may accurately maintain grip position of the container member as moving the container member back and forth.

EMBODIMENT FOR CARRYING OUT THE INVENTION

Hereinafter, the present invention will be described in detail with reference to the drawings.

Figure 1:
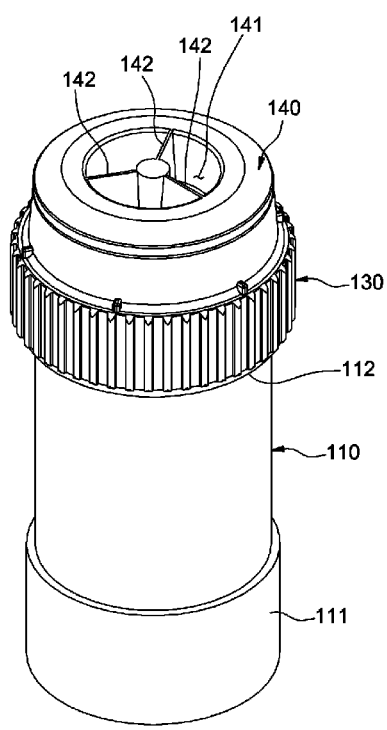
FIG. 1 is a perspective view of a vial device according to the present invention.
Figure 2:
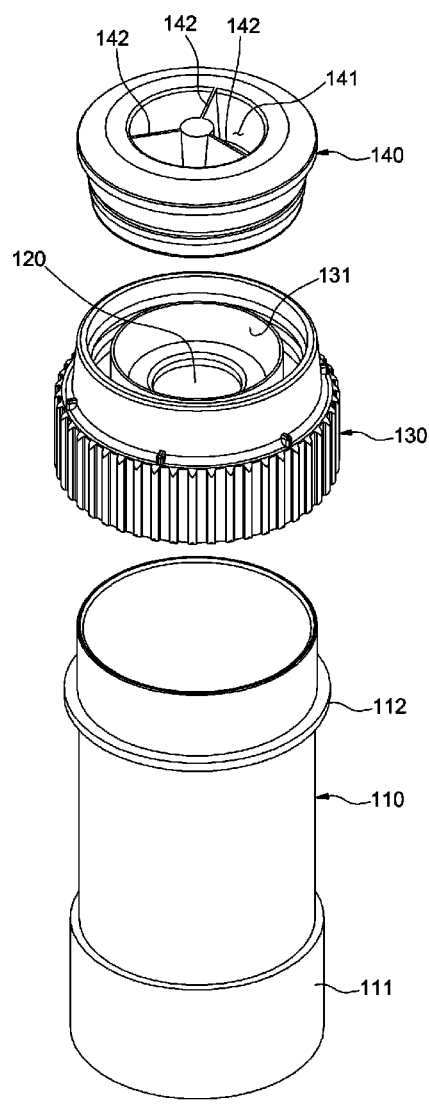
FIG. 2 is a first exploded perspective view of a vial device according to the present invention.
Figure 3:
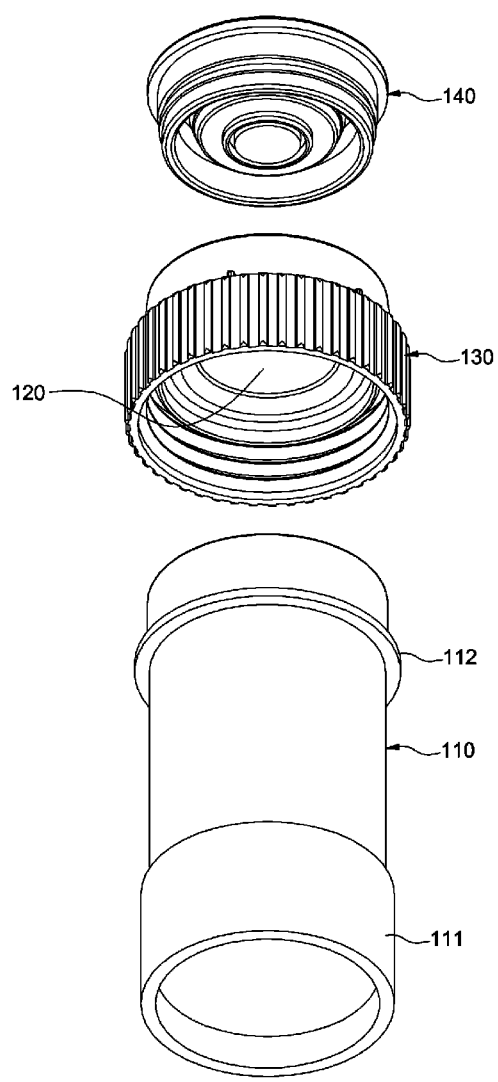
FIG. 3 is a second exploded perspective view of a vial device according to the present invention.
Figure 4:
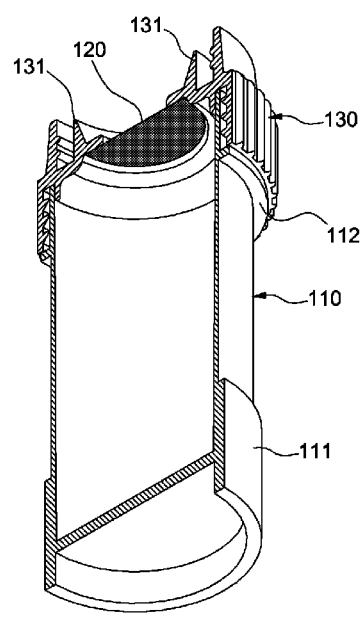
FIG. 4 is a cross-sectional perspective view of a vial device in which a membrane fixing member is coupled to a container member of the present invention.
Figure 5:
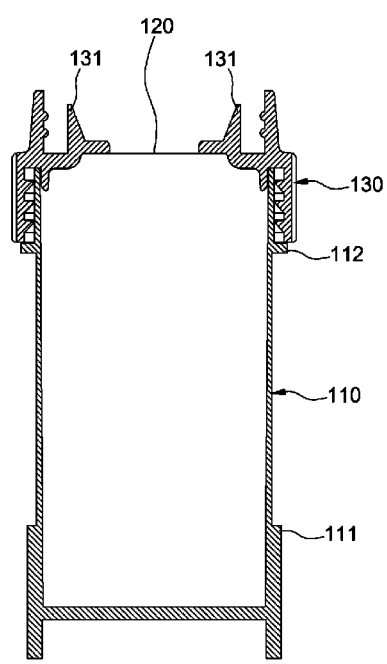
FIG. 5 is a front view of FIG. 4.
Figure 6:
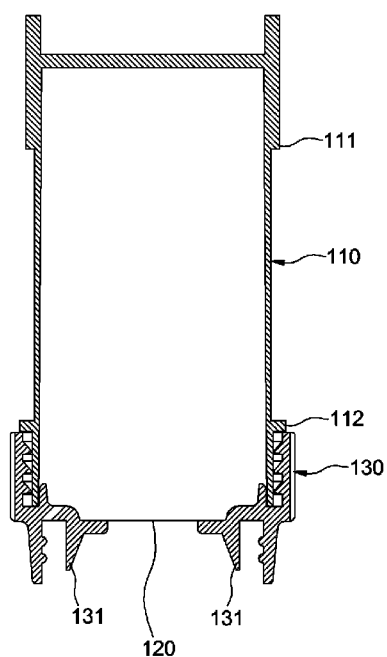
FIG. 6 is a upside-down view of FIG. 5.

FIG. 1 is a perspective view of a vial device according to the present invention, FIG. 2 is a first exploded perspective view of a vial device according to the present invention, FIG. 3 is a second exploded perspective view of a vial device according to the present invention, FIG. 4 is a cross-sectional perspective view of a vial device in which a membrane fixing member is coupled to a container member of the present invention, FIG. 5 is a front view of FIG. 4, and FIG. 6 is a upside-down view of FIG. 5.

Referring to FIGS. 1 to 6, the vial device for storing and smearing exfoliative cells according to the present invention may comprise a container member (110), a permeable membrane member (120), a membrane fixing member (130), and an opening cap (140).

As shown in FIGS. 2 and 3, the container member (110) has an entrance on its upper end for containing a specimen (e.g., exfoliative cells and liquid medium) inside thereof.

In this specification, the "specimen" is composed of a liquid component of a human body and exfoliative cells which are obtained from a human body. The exfoliative cells are mixed in the liquid component. In addition, the liquid component is expressed as liquid medium for exfoliative cells in that the liquid component interfaces the exfoliative cells to be mixed each other or floating.

Further, the "specimen" may contain by-products other than the exfoliative cells or liquid medium, which are obtained from the human body.

Referring to FIGS. 2 to 5, the permeable membrane member (120) is disposed inside of the container member (110), preferably in a location corresponding to the entrance of the container member (110), and has a porous membrane.

As shown in FIG. 6, when the container member (110) is disposed upside down with letting its entrance being positioned at the bottom, the permeable membrane member (120) blocks the exfoliative cells and liquid medium in the container member (110) from falling down.

The vial device according to the present invention is designed to be used not only in an upright position but also in upside-down position. Among the contents in the container member, the exfoliative cells sink down due to higher specific gravity than liquid medium or other by-products. As a result, the approach of smearing with letting the vial device upside-down position has an advantage of effective smearing than the approach of smearing with letting the vial device upright position. Accordingly, the permeable membrane member (120) and the inward-step portion (113) to be described later are provided in the present invention so that the vial device may be suitable for the approach of upside-down position.

Figure 8:
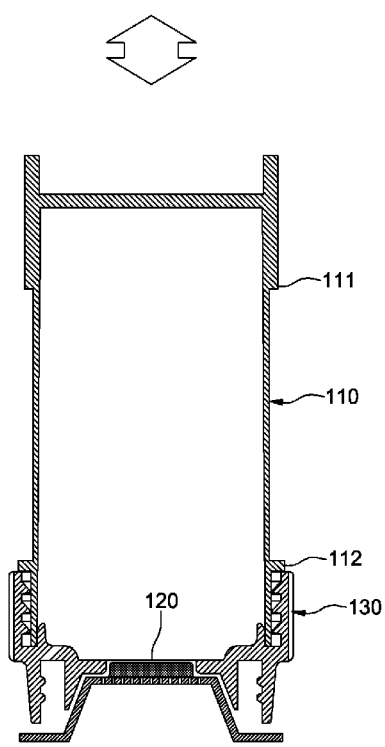
FIG. 8 is an exemplary view illustrating a state in which the permeable membrane member contacts with the filter in FIG. 7.

Further, when the container member (110) is applied on an external force as shown in FIG. 8 in the upside-down position as shown in FIG. 6, the permeable membrane member (120) discharges downward a part of the liquid medium and the exfoliative cells of the container member (110).

The membrane fixing member (130) is mounted on the edge of the entrance of the container member (110) in which the membrane fixing member (130) is integrally fastened with the permeable membrane member (120) along the rim of the permeable membrane member (120).

As a result, when the container member (110) is disposed upside down as shown in FIG. 6 with specimen being contained inside, the permeable membrane member (120) is not separated downward by the load of the specimen in the container member (110), since the membrane fixing member (130) maintains the fastenings with the permeable membrane member (120) and with the container member (110).

As shown in FIGS. 4 and 5, the membrane fixing member (130) may include an inner bridge (131) which is connected to the inner wall along the rim of the inner wall thereof. Preferably, the permeable membrane member (120) may be integrally fixed to the inner wall of the inner bridge (131) as shown in FIGS. 4 and 5.

In addition, the inner bridge (131) may be preferably elastically connected from the body of the membrane fixing member (130).

As a result, when the container member (110) is disposed in upside-down position as shown in FIG. 6 with specimen being contained inside and the permeable membrane member (120) is applied on an external force from the bottom, due to the elastic force of the inner bridge (131), it may be reduced the magnitude of the external force which is applied to the connection portion between the membrane fixing member (130) and the permeable membrane member (120).

Further, as shown in FIGS. 2 and 3, the membrane fixing member (130) may be detachably fastened with the rim of the container member (110) so as to form a double-cap structure together with the opening cap (140).

In case that the membrane fixing member (130) is separated from the container member (110), a suction unit (not shown) of the exfoliative cell processing device may suction the specimen from the container member (110) while vertically moving in and out of the container member (110) through the entrance.

In order that the suction unit can smoothly come in and out of the container member (110) without stopping, the container member (110) may preferably has a hollow cylindrical shape with its inner wall being flat and smooth.

As shown in FIGS. 1 to 3, the opening cap (140) is detachably fastened with the membrane fixing member (130) so as to block the permeable membrane member (120) from moving through the membrane fixing member (130).

As the opening cap (140) is separated from the membrane fixing member (130) as shown in FIGS. 4 to 6, the permeable membrane member (120) which is integrally fastened with the membrane fixing member (130) is exposed to the outside.

Further, the opening cap (140) comprises a recess (141) and one or more latching ribs (142). The recess (141) is recessed downward in the central part of the upper surface thereof. The latching ribs (142) are connected to the inner wall of the recess (141) as being erected on the inside of the recess (141).

An external rotating member (not shown) is inserted into the recess (141) and rotates, then the rotating member becomes caught by the latching ribs (142). The opening cap (140) rotates with respect to the membrane fixing member (130) so that the opening cap (140) becomes separated from the membrane fixing member (130).

As a result, as shown in FIGS. 4 to 6, as the opening cap (140) is separated from the membrane fixing member (130), the permeable membrane member (120) which is integrally fastened with the membrane fixing member (130) may be exposed to the outside.

Further, as shown in FIGS. 1 to 6, the container member (110) may include a lower outward-step portion (111) which protruding along its rim on its lower outer surface.

In case that a grip member (not shown) of the exfoliative cell processing device grips the outer surface of the container member (110) and moves back and forth the container member (110), including disposing the container member (110) upside down so as to let the opening cap (140) face downward as shown in FIG. 6, the lower outward-step portion (111) is caught by the grip member so as to prevent the container member (110) from slipping downward.

Figure 7:
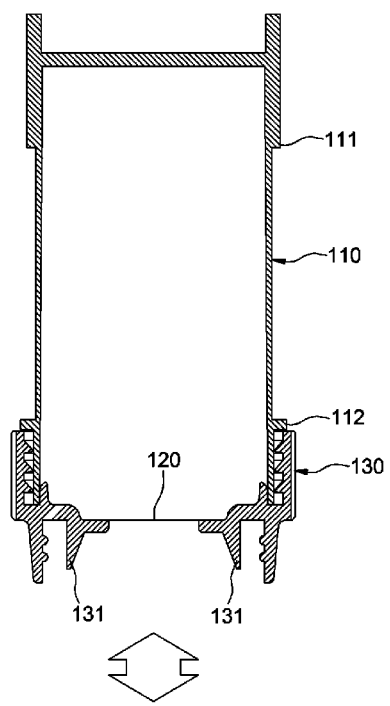
FIG. 7 is an exemplary view illustrating a state in which a permeable membrane member approaches to a filter in FIG. 6.
Figure 7:
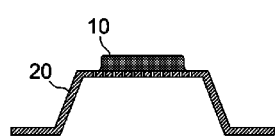

FIG. 7 is an exemplary view illustrating a state in which a permeable membrane member approaches to a filter in FIG. 6, and FIG. 8 is an exemplary view illustrating a state in which the permeable membrane member contacts with the filter in FIG. 7.

The permeable membrane member (120) is configured to support the load of specimen in the container member (110) so as to prevent the specimen from falling downward. When the permeable membrane member (120) moves downward to the filter (10) as shown in FIG. 7 so that an external force is activated by contacting the filter (10) as shown in FIG. 8, a part of specimen in the container member (110) passes through the permeable membrane member (120).

At this time, the exfoliative cells of the specimen which pass through the permeable membrane member (120) are thinly smeared on the filter (10). The filter (10) may be kept separated from the bottom surface by the support member (20).

Figure 9:
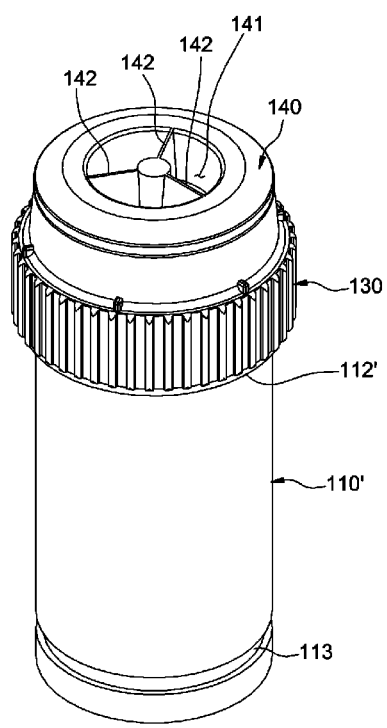
FIG. 9 is a perspective view of a vial device according to another embodiment of the present invention.
Figure 10:
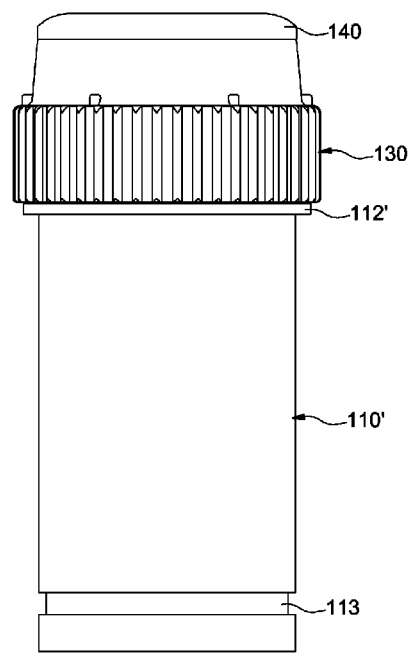
FIG. 10 is a view showing FIG. 9 from a different angle.

FIG. 9 is a perspective view of a vial device according to another embodiment of the present invention, and FIG. 10 is a view showing FIG. 9 from a different angle.

As shown in FIGS. 9 and 10, the container member (110') according to another embodiment of the present invention may comprise an inward-step portion (113) which is cut inwardly along the rim of the lower outer surface of the container member (110').

When a grip member (not shown) of the exfoliative cell processing device grips the outer surface of the container member (110) and then moves the container member (110') back and forth, the inward-step portion (113) is caught by the grip member so as to enable centering or accurate position control for the container member (110').

Further, the advantage of the inward-step portion (113) is maximized when the container member (110') is handled in an upside-down state. If the lower outward-step portion (111) is provided, it is quite difficult to handle the container member in an upside-down state. However, when the inward-step portion (113) is provided as shown in FIG. 9, the container member (110') may be smoothly handled in the upside-down state.

The invention claimed is:

1. A device for storing and smearing exfoliative cells, comprising:
    a filter configured to receive a dispensed part the exfoliative cells and a liquid medium to determine the state of the exfoliative cells;
    a container member having a vial body and an entrance on the upper end of the vial body for containing the exfoliative cells and liquid medium inside thereof;
    a permeable membrane member (120) disposed inside and corresponding to the entrance of the container member, wherein the permeable membrane member blocks the exfoliative cells and liquid medium housed in the container member from being discharged down when the container member is disposed upside down with an application of external force and the entrance to the container member is positioned at the bottom, and wherein the permeable membrane member permits a part of the liquid medium and the exfoliative cells housed in the container member be discharged down when the container member moves downward until the permeable membrane member contacts the filter upon activation of an external force to smear the discharged exfoliative cells on the filter, wherein the external force on the filter causes the permeable membrane to be pushed upward, which compresses the space inside the vial body and increases the internal pressure therein which causes the exfoliative cells and liquid to penetrate the permeable membrane member and onto the filter;
    a membrane fixing member (130) mounted on the edge of the entrance of the container member and integrally fastened along the rim of the permeable membrane member;
    an elastic inner bridge connected to the inner wall along the rim of the inner wall of the membrane fixing member and is elastically connected from the body of the membrane fixing member, wherein the elastic force of the inner bridge reduces the magnitude of the external force which is applied to the connection portion between the membrane fixing member and the permeable membrane member when the container member is disposed in upside-down position with specimen being contained inside and the permeable membrane member is applied on an external force from the bottom; and
    an opening cap (140) configured to be detachably fastened with the membrane fixing member to block the permeable membrane member from moving through the membrane fixing member.

2. The device for storing and smearing exfoliative cells according to claim 1, wherein the membrane fixing member (130) is detachably fastened with the rim of the container member so as to form a double-cap structure together with the opening cap.

3. The device for storing and smearing exfoliative cells according to claim 2, wherein the opening cap (140) comprises:
    a recess (141) being recessed downward in the central part of the upper surface thereof; and one or more latching ribs (142) being connected to the inner wall of the recess as being erected on the inside of the recess, and wherein when an external rotating member is inserted into the recess and rotates, the rotating member becomes caught by the latching ribs so that the opening cap separates from the membrane fixing member.

4. The device for storing and smearing exfoliative cells according to claim 3, wherein the container member (110) has a hollow cylindrical shape with its inner wall being flat and smooth.

5. The device for storing and smearing exfoliative cells according to claim 4, wherein the container member (110) comprises:

a lower outward-step portion (111) protruding along the rim on the lower outer surface of the container member; and wherein when an external grip member grips the outer surface of the container member with disposing the container member upside down so as to let the opening cap face downward, the lower outward-step portion is caught by the grip member so as to prevent the container member from slipping downward.

6. The vial device for storing and smearing exfoliative cells according to claim 4, wherein the container member (110) comprises:

an inward-step portion (113) being cut inwardly along the rim of the lower outer surface of the container member; and wherein the inward-step portion (113) is caught by an external grip member.

\* \* \* \* \*